United States Patent [19]

Smart et al.

[11] Patent Number: 5,032,854
[45] Date of Patent: Jul. 16, 1991

[54] PHOTOGRAPHIC FILM CASSETTE AND CAMERA APPARATUS AND METHOD

[75] Inventors: David C. Smart, Fairport; J. David Cocca, Rochester, both of N.Y.

[73] Assignee: Eastman Kodak Company, Rochester, N.Y.

[21] Appl. No.: 560,921

[22] Filed: Jul. 31, 1990

[51] Int. Cl.⁵ .................. G03B 17/26; G03B 17/36
[52] U.S. Cl. .................................. 354/21; 354/217; 354/275; 354/289.1
[58] Field of Search ............ 354/214, 217, 275, 289.1, 354/218, 21; 242/71.1

[56] References Cited

U.S. PATENT DOCUMENTS

| | | | |
|---|---|---|---|
| 4,349,272 | 9/1982 | Holthusen | 355/69 |
| 4,500,183 | 2/1985 | Tanikawa | 354/21 |
| 4,693,574 | 9/1987 | Ohnuki et al. | 354/21 |
| 4,947,197 | 8/1990 | Smart et al. | 354/214 |
| 4,965,600 | 10/1990 | Smart et al. | 354/289.1 X |
| 4,978,985 | 12/1990 | Smart et al. | 354/275 |
| 4,987,437 | 1/1991 | Pagano et al. | 354/275 |

FOREIGN PATENT DOCUMENTS 51-29617 8/1976 Japan .
53-72677 12/1979 Japan .
58-66182 4/1983 Japan .
58-211343 12/1983 Japan .

Primary Examiner—A. A. Mathews
Attorney, Agent, or Firm—Francis H. Boos, Jr.

[57] ABSTRACT

A radial bar code providing DX film information is disposed on a disc mounted at an axial end of a film cassette, the disc being rotatable with rotation of the film spool during film extraction and rewind. Film exposure status visual indicators are disposed on the disc and the cassette housing. A stationary optical reader in the camera in association with a logic and control circuit is provided to read the DX information from the rotating disc during film extraction for suitable control of exposure conditions in the camera. During film rewind the angular positioning of the disc can be measured from the bar code to cause the disc to be stopped at the end of rewind with appropriate ones of the status indicators aligned to provide a visual indication of the film exposure status to the camera user.

17 Claims, 4 Drawing Sheets

PHOTOGRAPHIC FILM CASSETTE AND CAMERA APPARATUS AND METHOD

FIELD OF INVENTION

This invention relates to the field of film photography and more specifically to film cassettes bearing optically readable bar code indicia providing information relating to the film and which is also usable to set exposure status visual indicators on the cassette as well as to camera apparatus operable therewith.

BACKGROUND OF INVENTION

It is well known to provide certain limited information regarding film contained in a cassette by means of a DX code imprinted on the exterior of the cassette. The code is typically embodied in conductive and non-conductive segments on the cylindrical body of the cassette which are sensed by electrical contacts in the camera. It is also known to provide DX information about the film in the form of an optical bar code imprinted on the cylindrical body of the cassette, the optical bar code having the advantage that more information about the film can be provided than is found in the conductive/non-conductive DX code segments. A problem with the bar code fixed on the cylindrical body of the cassette however, is that it requires the provision of a moving optical reader to be able to scan the length of the bar code which is costly and difficult to provide in a compact camera.

In U.S. Pat. No. 4,500,183, film-related information is encoded on a rotatable magnetic disk axially mounted on the end of the film cassette and a drive mechanism is provided to rotate the disk so that the information can be read and recorded thereon by a stationary magnetic read/write head mounted in the camera. Although useful for its purpose, it requires costly disk drive and magnetic read/write components for its operation and reliability in reading of the magnetically recorded information can be adversely affected by variations in spacing between the read/record head and the magnetic surface as well as by the presence of stray fields emanating from drive motors in the camera.

In customary operation of a camera, when all image frames in a film strip are fully exposed, the film is rewound into the cassette to be removed and sent to a photofinisher for processing. At times, however, it is desirable to remove a cassette with the film unused or in a partially exposed condition. A common reason for this is to allow the camera user to change film types to better suit a particular photographic opportunity. In such a case, it is desirable to provide an indication to the user of the exposure status of the film as being unused, partially exposed or fully exposed so that double exposures are prevented if the cassette is subsequently reinserted into the camera.

In the above mentioned U.S. Pat. No. 4,500,183, provision is made for recording film use condition on the magnetic disk when film is rewound so that the camera can read the disk when a cartridge is inserted to give an indication to the user of the film use condition or to move the film to the first available unexposed frame. However, the disadvantage of this arrangement is that the cassette does not have a visual indication of the exposure status of the film and the cassette must be fully loaded and the camera operated in order to provide any indication of film use condition to the camera user. In preference to this arrangement, it is desirable to provide a visible indication on the cassette itself of the use condition of the film, particularly if the camera user has several cassettes to select from. This can be done by setting a rotatable indicator at one of several predetermined angular positions that visually indicates the condition of the film as being, for example, fully exposed, partially exposed or unexposed. For this purpose, however, some means must be provided to sense and keep track of the angular positioning of the indicator to assure proper positioning of the indicator at the conclusion of film rewind.

It is therefore an object of the invention to provide a film cassette with optically readable bar coded information that does not require a moving optical sensor to read the codes information.

It is a further object of the invention to provide a film cassette in which optically readable bar code information disposed thereon can be utilized to determine angular positioning of the film spool as film is unwound out of or rewound into the cassette.

It is a still further object of the invention to provide a film cassette with optically readable bar code information which can be used to set exposure status visual indicators on the cassette upon conclusion of film rewind into the cassette.

It is another object of the invention to provide photographic apparatus with a stationary optical reader adapted to read bar code information from a film cassette of the type described above.

It is yet another object of the invention to provide camera apparatus adapted to align visual indicators of a cassette of the type described above by measuring the bar code to set angular positioning of a rotable component of the cassette.

Finally, it is another object of the invention to provide a method of aligning visual indicators on a film cassette in a camera by sensing a radial bar code on a rotating component associated with the cassette.

SUMMARY OF INVENTION

Thus in accordance with a particular object of the invention, a photographic film cassette is provided with a cassette housing having a rotatable disc axially mounted at one end thereof, the disc having optically readable bar code indicia circumferentially disposed on an exterior surface of the disc. In one preferred form of the invention, the disc is mounted for rotation with a film spool in the cassette and may, for example, be mounted on the spool end for direct rotation with the spool. Thus, when the cassette is inserted in a camera and the film unwound from the cassette by suitable means, the bar code can be read by a stationary optical reader in the camera to extract information about the film for use by a controller in the camera to set exposure conditions and the like.

In accord with a particular feature of the invention, the bar code format is comprised of alternating elements of bars and spaces in which the angular dimension of each of said elements along the circumferential code path corresponds to an integral multiple of a predetermined angular segment of the disc and thus by reading the bar code and correlating the bar code elements to rotational angle, the bar code can be used not only to provide information concerning film characteristics (e.g. DX information) but can also be used for measurement of angular positioning of the disc and/or the film spool as the film is extracted or rewound.

Given such an arrangement, and in accordance with a further feature of the invention, the cassette is provided with first indicator means fixed relative the cassette housing and second indicator means rotatable with at least the disc during film rewind wherein one of the indicator means includes a plurality of film usage condition positions angularly space around the cassette axis and the other indicator means is comprised of a selector position, such that the location of the selector position relative to a particular one to the plurality of indicator positions at the conclusion of film rewind, as determined by measurement of the bar code elements during rewind, provides a visual indication of the exposure status of the film in the cassette.

DETAILED DESCRIPTION

Figure 1:
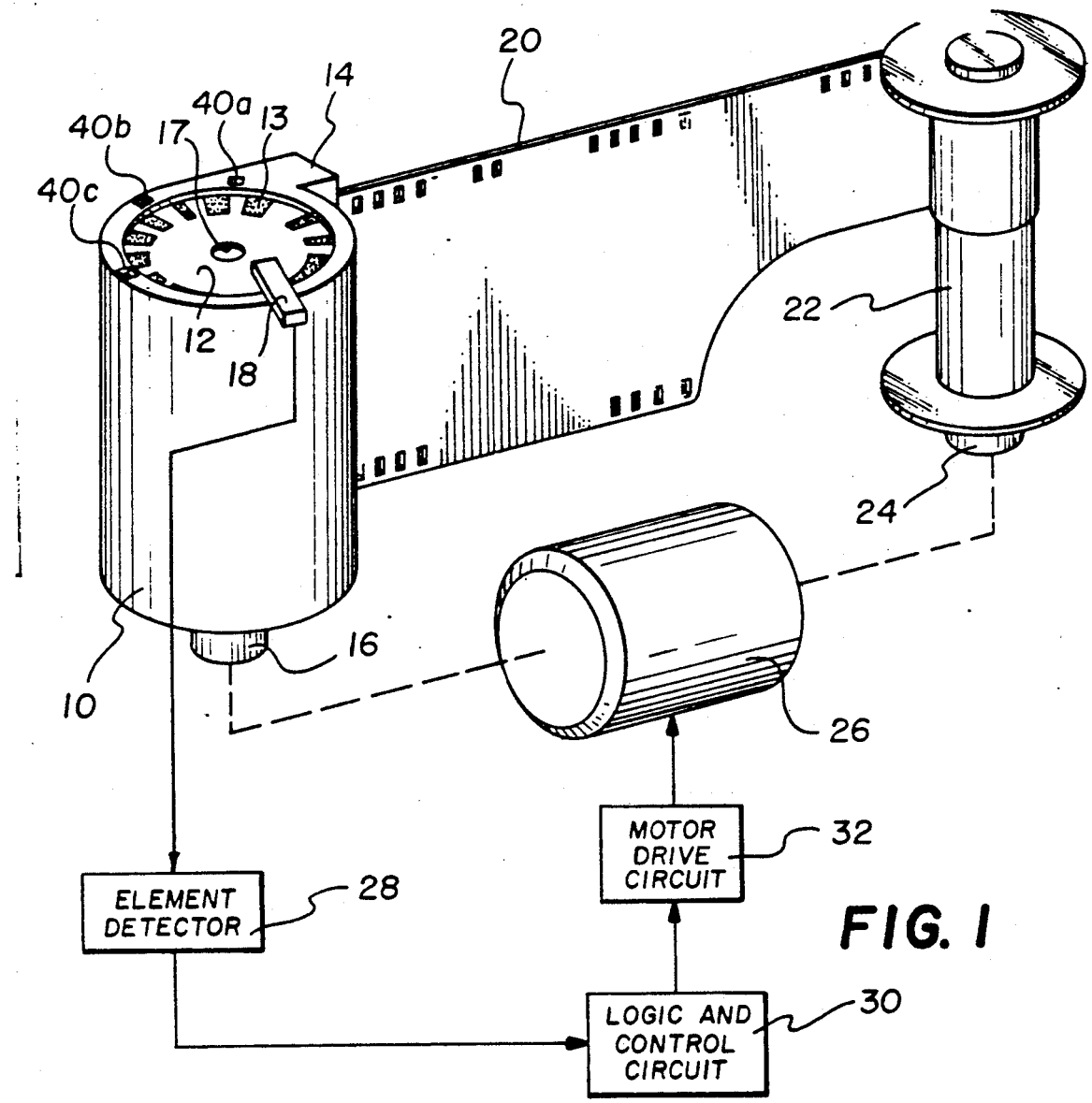
FIG. 1 is a partly perspective and partly schematic illustration of elements of a photographic camera and film cassette constructed in accordance with the invention.

Referring now to FIG. 1, the basic elements of a photographic camera useful in understanding the principles of the present invention include takeup spool 22, film drive motor 26 and associated drive motor circuit 32 and logic and control circuit 30. A film cassette 10 is removably positioned in a cassette-receiving portion of the camera (the camera body not being shown) such that film can be drawn out of the cassette over a film exposure gate (not shown) and onto takeup spool 22.

In accordance with a feature of the invention, cassette 10 is provided with a rotatable disc 12 on one end of the cassette, the disc having a radial bar code 13 circumferentially disposed on the exterior planar surface of disc 12 adjacent the outer perimeter thereof. A stationary optical reader 18 is included in the camera with a photosensor 18a (FIG. 2) positioned so as to be over the circumferential path of bar code 13 as disc 12 rotates. The analog output of reader 18 is converted to a digital signal by a bar code element detector circuit 28 and applied to an input of logic control circuit 30. The bar code 13 may include information about the film such as film type, ISO information, number of image frames etc. which can be read by reader 18 and input into logic and control circuit 26 to control camera operation in a well known manner. Since disc 12 is rotatable to convey bar code 13 under reader 18, reader 18 may be fixed in place within the camera thus simplifying the mechanism for optical reading of the bar code.

Figure 2:
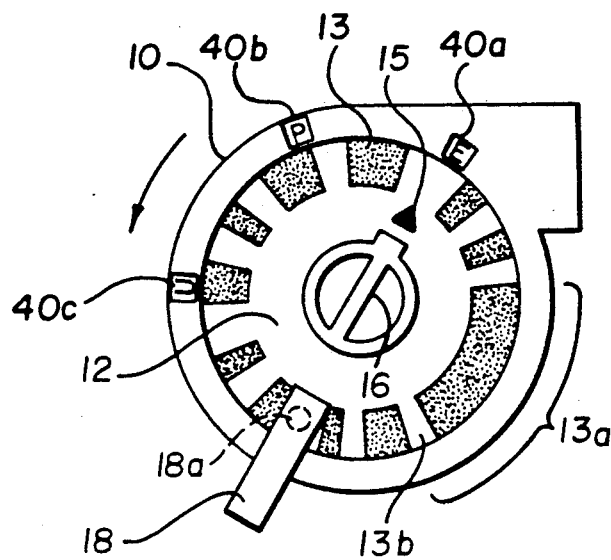
FIG. 2 is an end view of a film cassette illustrating a bar code device and visual exposure indicator according to the present invention.

The cassette 10 of FIGS. 1 and 2 includes indicator means comprised of indicia 40–40c fixed at spaced-apart angular positions on the exterior of cassette with each indicium uniquely indicating a particular usage condition of film in the cassette. Thus, indicium 40c (U) indicates unused film, indicium 40b (P) indicates partially exposed film indicium 40a (E) fully exposed film. On rotatable disc 12, a selector indicium, shown as arrowhead 15, is provided to select the particular film usage indicator in accordance with the angular position of disc 12. As will be seen, measurement of the bar code 13 during film rewind is used to determine the angular position at which disc 12 is stopped at the conclusion of rewind such that selector 15 is pointed at the desired one of the film usage indicators 40a–40c. It will be appreciated that relative orientation of film usage indicators 40a–40c and the selector indicator 15 could be reversed such that selector 15 is fixed on the periphery of cassette 10 and the usage indicators are angularly spaced about disc 12.

Disc 12 may be mounted separately of the film spool for rotation by means of an external drive mechanism (not shown) in the camera which can be coupled to the disc by means of a drive pin engaging a drive hole 17 in the disc. Alternatively, and more preferably, disc 12 may be attached directly to the end of the cassette film spool or else keyed thereto as shown in FIG. 2 for direct rotation with the spool as the film is extracted from the cassette by takeup spool 22 or as the film is rewound into the cassette by operation of drive motor 26 engaged with the drive end 16 of the film spool.

Bar code 13 on disc 12 preferably has a predetermined format of alternating bars and spaces in which the width or angular relationship of the bars and spaces in successive binary positions of the circumferential code path corresponds to an integral multiple of a predetermined angular segment of the disc. For example, in a simple bar code comprised of alternating bar and space elements wherein narrow elements (bars or spaces) represent binary 0's and wide elements (bars or spaces) represent binary 1's, each narrow element would have a selected angular width, such as 5°, and each wide element would be a known multiple of the narrow element, such as 3x or 15°. Although an integral relationship is desirable, non-integral multiples can be employed, so long as, preferably, the relationship between wide and narrow elements is known and is consistent around the length of the bar code. Additionally, the bar code includes a singular code pattern 13a serving as a start code, preferably appearing only once in the 360° rotation of the disc, which would then also serve as a reference point from which angular position of the disc can be determined relative to the detected bar code segments as they pass under the photosensor 18a in the reader 18. As seen in FIG. 2, the start code may consist of an extended bar (quiet zone) significantly greater than 15° in width followed by a narrow space of standard 5° width although it will be appreciated that any unique pattern may serve for start code purposes.

As thus described, the rotating radial bar code 13 has a dual function of serving, during extraction of the film from the cassette unto the take-up spool, to provide the aforementioned film-related information represented by the binary data in the bar code and, during either film extraction or rewind, to provide a convenient pattern for measuring and determining the angular positioning of the disc. The latter function is useful for monitoring film transport speed in the camera and, during rewind in particular, it is useful for providing the above-described visual indication on the cassette of the usage or exposure status of the film in the cassette at the conclusion of rewind.

Figure 3:
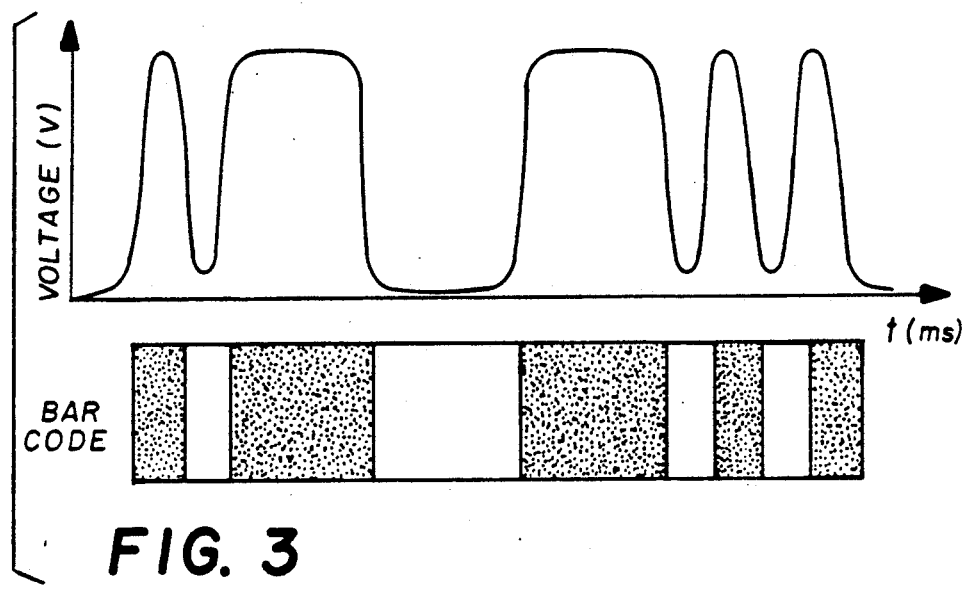
FIG. 3 is a diagram of a portion of a bar code and a signal produced therefrom which is useful in explaining the invention.

In operation, when a cassette 10 is inserted into the camera and film prewind activated to extract film from the cassette, disc 12 rotates either by means of a separate drive or in concert with the rotation of the film spool driven by the operation of drive motor 26 acting on spool drive 16. As disc 12 rotates, a bar code output signal is fed from optical reader 18 through a bar code element signal detector circuit 28 to an input of logic and control circuit 30. A representative portion of the bar code and the corresponding signal timing diagram appearing at the output of optical reader 18 are shown in FIG. 3. By analyzing the measured pulse widths, the camera logic and control circuit 30 can determine which elements are wide and which are narrow. The data collected from a scan can then be converted to a binary code such that every wide element is equated to a "1" and every narrow element to a "0". When read and converted, the data can be stored in a non-volatile memory located in logic and control circuit 30 with the first bit data bit in memory representing the first binary element of the start code and the last bit corresponding to the last element of the bar code.

Figure 4:
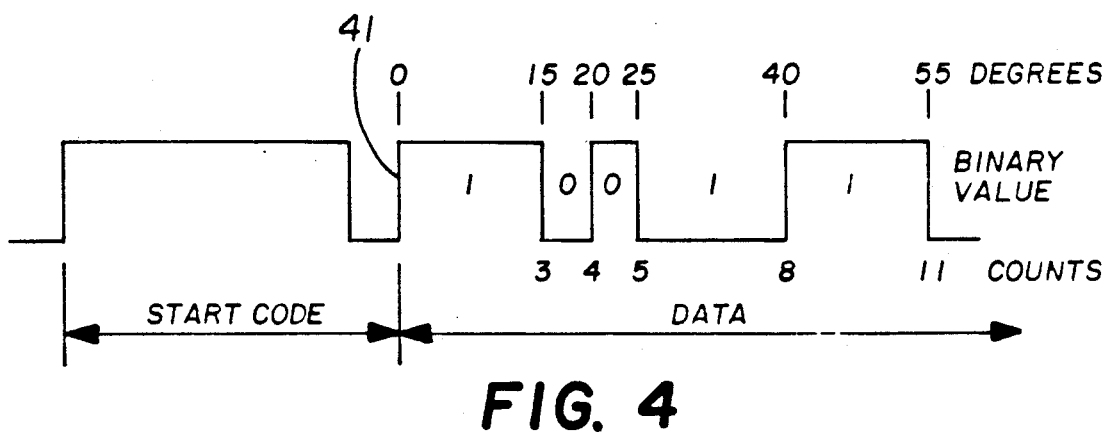
FIG. 4 is a binary signal diagram useful in explaining the invention.

A fresh, unused cassette with unexposed film will typically have disc 12 angularly positioned with a selector indicator 15 on disc 12 pointing to an indicator position 40c (U) on the periphery of cassette 10 to visually indicate to the camera user that none of the film in the cassette has been exposed. When the cassette is loaded into the camera and the back closed, motor drive 26 is activated to cause the film to be extracted from the cassette and wound onto take-up spool 22. As the film is extracted, disc 12 rotates with the spool in the clockwise direction as viewed in FIG. 2 causing the bar code data to be read out and applied to logic and control circuit 30. In FIG. 3a, the analog signal output of reader 18 is shown for a representative segment of bar code illustrated in FIG. 3b. A binary representation of this signal is stored by suitable signal processing means in a non-volatile memory within the logic and control circuit 30 with narrow elements stored as a "0" and wide elements stored as a "1". The stored information is then available for use by the camera, for example to control exposure conditions. Once all frames in the film strip have been exposed, film rewind is initiated, either automatically or by the user pushing a suitable button on the camera, and a signal indicating that all frames on the film strip have been exposed is stored in logic and control circuit 30. Motor drive 26 is activated to drive the cassette 10 film spool in the counterclockwise direction to retract the film from takeup spool 22 into the cassette and at the same time to cause bar code disc 12 to rotate in the counterclockwise direction. During rewind, the logic circuit and control circuit 30 can calculate, from the stored bar code binary data, the particular signal transition which is closest to the angular position associated with the desired film usage indicator. Once the camera determines by suitable sensor means that the image frames portion of the film strip has been rewound into the cassette, logic and control circuit 30 senses the start code segment 13a and causes drive circuit 32 to brake drive motor 26 when that particular transition in the bar code signal is sensed. The process is illustrated in FIG. 4 wherein the rising signal edge 41 at the beginning of the bar code data stream corresponds to the end 13b of the narrow space at the end of the start code 13a. It is assumed that, for a fully exposed film rewound into cassette 10 of FIG. 2, disc 12 must be stopped at an angular position of 40° as measured in the clockwise direction from the end 13b of the start code segment 13a in order to align arrowhead indicator 15 with the "E" position 40a. The logic circuit 30, by assigning a value of 1 to each narrow element and a value of 3 to each wide element, calculates that at a cumulative value of 8, the disc should be stopped and the indicator 15 will be properly aligned with the "E" fully exposed indicator 40a. It is therefore only necessary to sense bar code signal transitions in this process since each transition will be assigned the appropriate weighted value by logic circuit 30 to cause disc 12 to stop at the appropriate angular position. Obviously, if disc 12 is integral with or driven directly with the film spool, operation to initiate controlled stopping of the disc is timed by logic circuit 30 to occur only after the film has been wholly or substantially rewound into the cassette 10 to assure protection of the image frame portion of the film strip. On the other hand, if disc 12 is driven separately of the film spool, the setting of the disc at the desired angular position can be accomplished at any time during the rewind process.

A similar operation occurs for each of the conditions in which rewind is initiated by the user either without having taken any pictures or after some but not all of the available frame have been exposed. In the former case, a 0 frames exposed flag is set in logic circuit 30 by an appropriate sensor determining that the shutter has not been activated and in the latter case a mid-roll interrupt flag is set by the user pushing a suitable mid-roll rewind button, both features being well known in the camera art.

Figure 5:
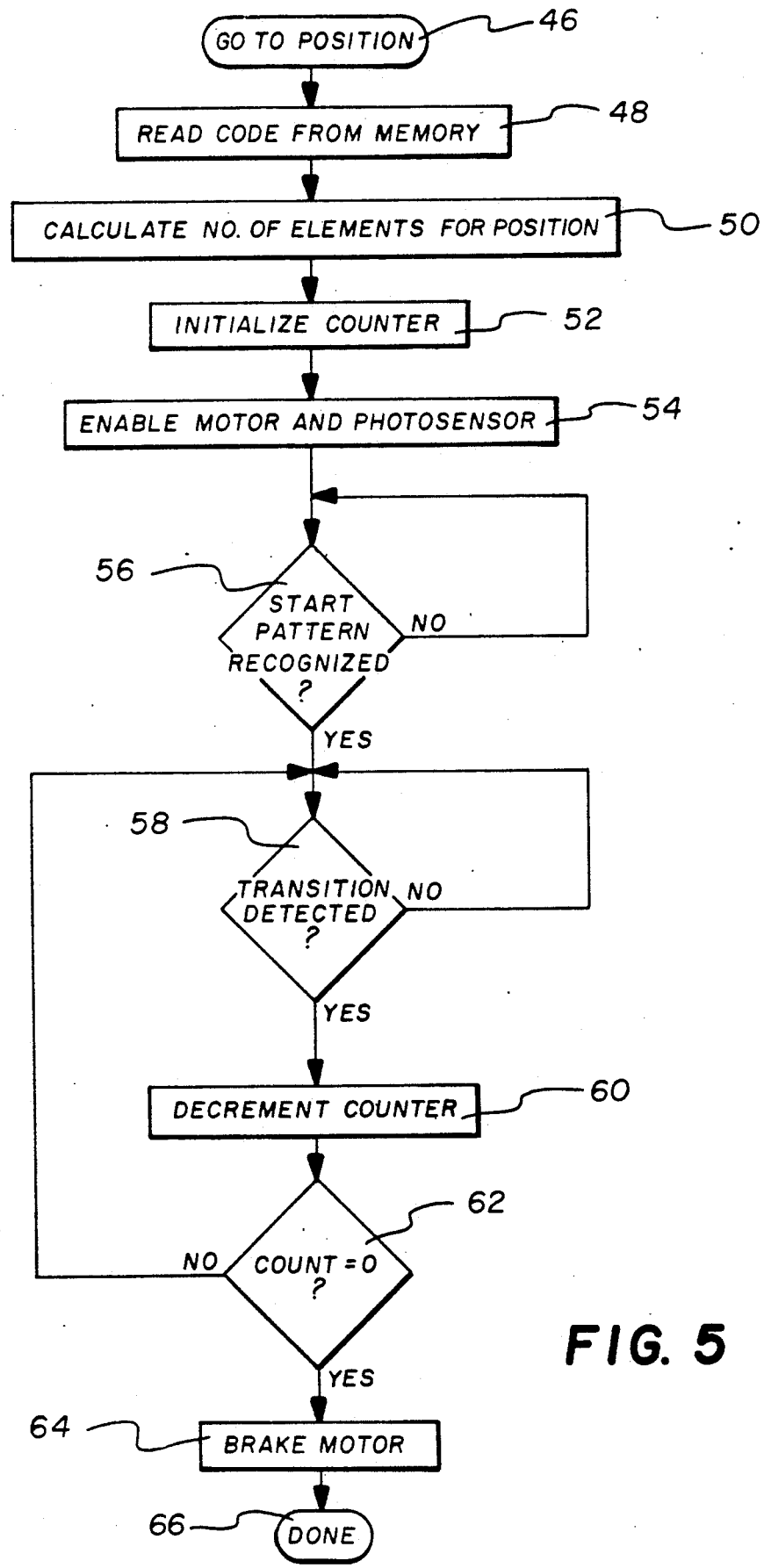
FIG. 5 is a logic flow chart for a program which may be used in a camera central processor unit in carrying out the present invention.

The logic flow diagram of FIG. 5 illustrates the manner in which logic and control circuit 30 may be programmed to perform the operation just described for stopping the disc with the indicators properly aligned based on measurement of the bar code. It will be appreciated that any suitable microprocessor-based controller such as currently found in camera apparatus may utilized for the control functions described herein. Thus when it is determined by control circuit 30 that a controlled stop of disc 12 is to be initiated at subprogram entry point 46, instruction step 48 reads the stored bar code and instruction step 50. Then, using the particular rewind flag input from the camera sensors, instruction step 50 calculates the number of elements (or transitions) in the bar code that will cause disc 12 to be stopped at the proper angular position to align indicator 15 with the appropriate one of indicator positions 40-40c. Following this instruction 52 initializes counter by setting it to the number calculated in instruction 50 (e.g. 8 in the above described example) and the photosensor 18a in optical reader 18 is enabled by instruction 54 and motor 26 is started assuming it has not previously been activated. When the start code pattern 13a is recognized, as determined by test 56, test 58 waits for the detection of transitions in the bar code signal from the photosensor. As each transition is detected, the counter is decremented by a count of one or three depending on the bar code involved and the process repeated until the counter reaches zero as determined by test 62. At this point instruction 64 brakes drive motor 26 and the subprogram is exited at 66 with indicator 15 on disc 12 aligned with the desired one of film usage indicators 40a-40c (e.g. indicator E in the above example).

It will be appreciated that using bar code transition counts as the measurement for stopping disc 12 may result in some misalignment of the selector 15 with the desired usage indicator 40a-40c. For example, with the arrangement described above in which narrow elements correspond to 5° and wide elements correspond to 15°, the positioning of selector 15 could be off by ±5°. In other words, the possible position error would the number of degrees per wide bar code element divided by 2. By suitable spacing of the usage indicator elements 40a-40c, however, an positioning error of such a relatively small amount should not present any difficulty.

In the embodiment of the invention just described, positioning of the visual indicators on the cassette is accomplished by counting transitions in the sensed bar code elements. In another embodiment of the invention, the camera logic and control circuit uses a start code bar width measurement as a means for generating an internal clocking mechanism in the logic circuit which is then used by the controller to position the disc and accordingly to line up the indicators as desired. When it is desired to initiate positioning of the disc, the drive motor is enabled and the logic and controller circuit begins reading the bar code, searching for the start code segment. When the start code is recognized, the element widths are measured in known manner which are then used to initiate a sync or code clock. Preferably using a narrow element width in the start code corresponding to a narrow element in the data code, the sync clock is established such that the sync "ticks" are integrally related to the code elements. For this embodiment, it is necessary that the width of the narrow and wide elements of the data code be integrally related as will become apparent from the following description.

Figure 6:
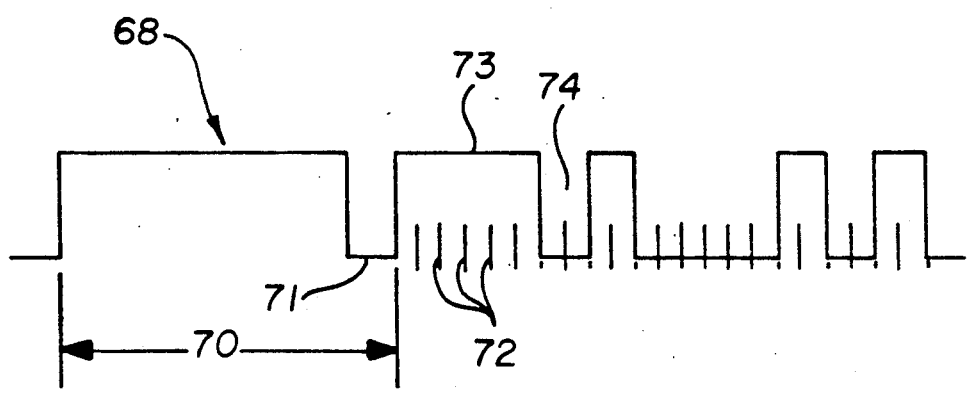
FIG. 6 is a bar code signal diagram useful in explaining another embodiment of the invention.

Referring to FIG. 6, a bar code signal 68 sensed by the camera optical reader is shown comprised of a start code segment 70 followed by the data code elements 73,74. The illustrated start code segment 70 is comprised of a wide element or quiet zone followed by a narrow element 71 which is preferably of the same width as the narrow elements 74 of the ensuing data code. As previously noted, the pulse width measurements correspond to the rotational angle on the bar code disc 12. The narrow element width measurement is used to establish a sync clock period in the logic and control circuit in the camera. Preferably the width is divided by some multiple greater than one to establish a finer positional resolution than represented by the narrow element of the start code and of the data code elements. Once the sync period is established, the logic and control circuit can calculate the number of sync "ticks" that will provide the required angular displacement positioning of the disc that will achieve the desired alignment of the visual indicators on the cassette.

Figure 7:
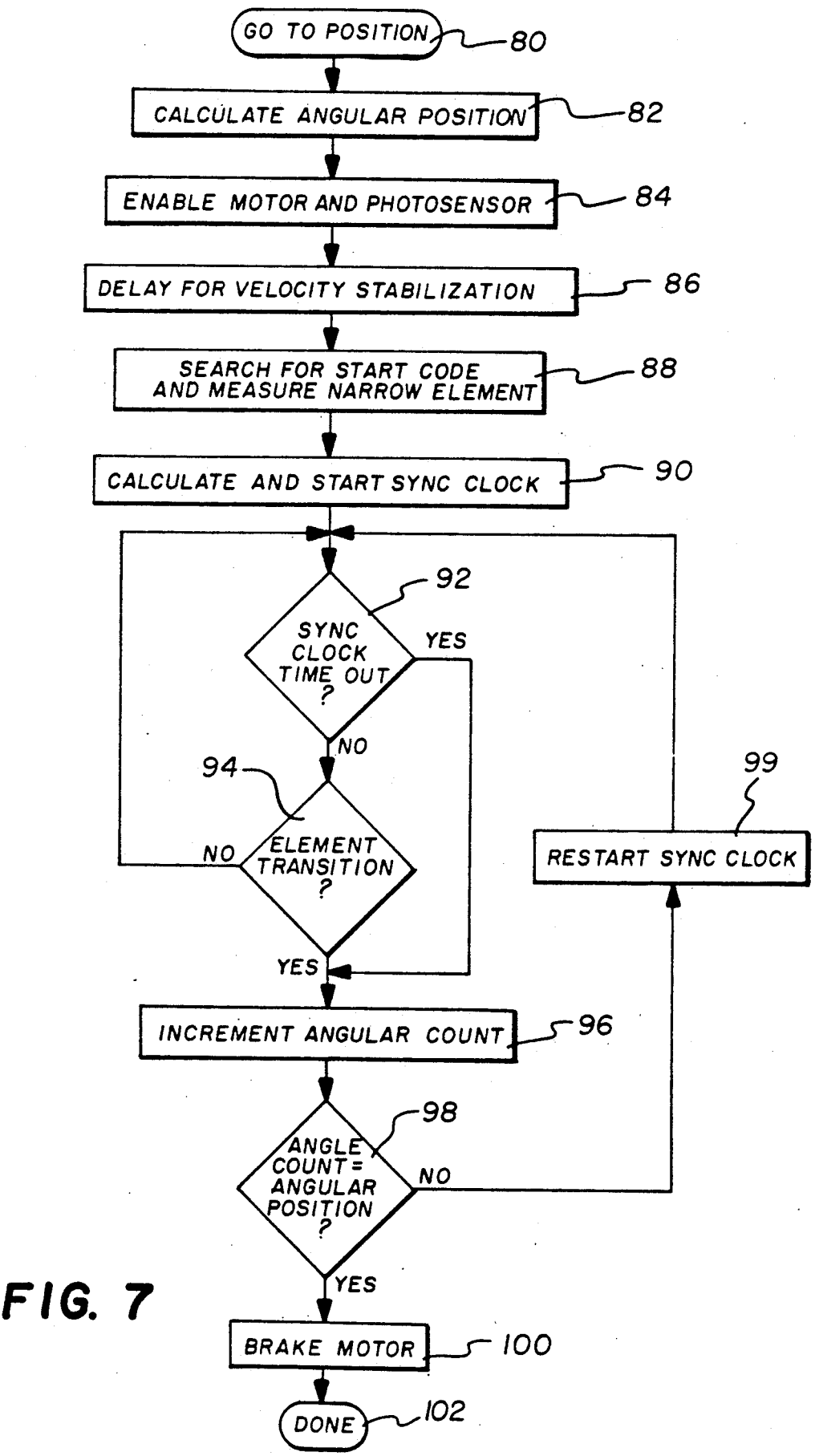
FIG. 7 is a logic flow chart used in explaining the invention embodiment of FIG. 6.

The manner in which the camera logic and control circuit can be programmed to achieve this result can be described with reference to the flow chart of FIG. 7. Upon entering the positioning subprogram at 80, instruction 82 calculate the angular position at which disc 12 will align the visual indicators as desired. Instruction 84 then enables the drive motor 26 and the photosensor 18a in the optical reader 18. After this, instruction 86 is preferably included to insert a short delay to allow the film transport speed to get up and stabilize at the normal rate. Once the transport speed is stabilized, instruction 88 causes the start code to be recognized as it passes under the reader and the angular width of the narrow element in the start code to be measured. Instruction 90 then calculates the angular sync period, for example by dividing the narrow element width by a factor of 2 and start the sync clock running at the calculated rate. Tests 92 and 94 begin cycling until either a sync "tick" or a bar code data element transition is sensed at which time instruction 96 a cumulative angular count counter to be incremented by the amount of the angular count determined by instruction 90. Following this, test 98 determines whether the desired aggregate count has been reaches and, if not, the sync clock is restarted by instruction 99. In this way, the sync clock is synchronized to the bar code on a continuous measurement basis and consequently any slight variations in disc rotational rate are continuously accommodated. Once the desired angular count is reached, instruction 100 brakes the drive motor with the visual indicators now properly aligned and the subprogram is exited is exited at 102.

As will be apparent from this description, by positioning the stopping of the disc according to a sync clock separate from the bar code elements at an angular rate that is a submultiple of the bar code angular widths, a finer degree of control can be exerted on the stopping position of the disc than can be accomplished with positioning directly off the measurement of the bar code elements.

The invention has been described in detail with particular reference to a presently preferred embodiment, but it will be understood that variations and modifications can be effected within the spirit and scope of the invention. For example, while the radial bar code 13 is generally illustrated as lying on the planar surface of disc, it may alternatively be imprinted on the circumferential edge of the disk to be viewed through an aperture in the cassette housing by an optical reader disposed radially outward from the axis of the film spool. Also, the visual indicators need not be disposed directly on the bar code disc but may be disposed on another part of the cassette such as a separate disc at the opposite end of the film spool and arranged to rotate along with rotation of the bar code disc so that stopping of the bar code disc at a particular angular position causes the visual indicator on the separate disc to be aligned in the desire manner with a visual indicator fixed on the cassette housing.

What is claimed is:

1. A photographic film cassette comprising:
    an elongated film cassette housing having a rotatable disc axially mounted at one end thereof, the disc having optically readable bar code indicia circumferentially disposed on an exterior surface of the disc;
    and first indicator means fixed relative to the cassette housing and second indicator means rotatable with the disc, one of said indicator means having a plurality of indicator positions angularly spaced around the spool axis and the other indicator means having a selector position, the location of the selector position relative to a particular one of the plurality of indicator positions at the conclusion of film rewind, as determined by measurement of the bar code during rewind, providing an indication of a particular usage condition of the film in the cassette.

2. A film cassette according to claim 1 in which the cassette is generally cylindrical in shape and the disc is rotatable about a longitudinal dimension of the cassette.

3. A film cassette according to claim 1 in which the cassette is generally cylindrical in shape and the disc is rotatable about the central axis of the cassette.

4. A film cassette according to claim 1 in which the bar code is a radial bar code disposed on a planar face of the disc facing outwards of the cassette.

5. A photographic film cassette according to claim 1 further including a rotatable film spool axially mounted in the cassette, said disc being rotatable in association with rotation of said spool, and further including first indicator means fixed relative to the cassette housing and second indicator means rotatable with the disc; one of said indicator means having a plurality of indicator positions angularly spaced around the spool axis and the other indicator means having a selector position, the location of the selector position relative to a particular one of the plurality of indicator positions at the conclusion of film rewind, as determined by measurement of the bar code during rewind, providing an indication of a particular usage condition of the film in the cassette.

6. The film cassette of claim 5 in which said usage condition is exposure status of the film.

7. The film cassette of claim 5 in which the disc is formed on the end of the spool so as to be directly rotatable with the spool.

8. The film cassette of claim 5 in which the disc is mounted for rotation independent of rotation of the spool.

9. A photographic film cassette comprising:
a generally cylindrical cassette housing having a central axis;
a rotatable disc axially mounted at one end of the cassette housing;
optically readable bar code indicia disposed in a circumferential path on an exterior surface of the disc, said bar code having a predetermined format of alternating elements of bars and spaces in which the angular dimension of each of said elements along the circumferential code path corresponds to a predetermined multiple of a predetermined angular segment of the disc;
film usage condition indicator positions angularly spaced about the axis of the cassette, each position being indicative of a discrete possible usage condition of film in the cassette;
and a selector position, said selector position and condition indicator positions being rotatable relative to each other, one of either said selector position or said condition indicator positions being rotatable with said disc and the other being stationary relative to said cassette housing, whereby stoppage of rotation of said disc at a predetermined angular position of the disc relative to the cassette housing, as determined by measurement of the bar code elements during film rewind, aligns said selector position with one of said film indicator positions thereby visually indicating a respective one of said usage conditions of the film in the cassette.

10. The photographic film cassette of claim 9 in which the bar code is comprised of a radial bar code with said bar code elements extending radially outward of the central axis of the cassette, the bar code being disposed on a planar face of the disc.

11. The photographic film cassette of claim 9 in which said indicator positions are in fixed spaced relationship about an exterior surface of the cassette housing and the selector is rotatable with the bar coded disc.

12. Photographic apparatus comprising:
means for receiving a generally cylindrical cassette having a rotatable disc axially mounted at one end of the cassette, the disc having optically readable radial bar code indicia circumferentially disposed on an exterior surface of the disc, said bar code indicia being representative of predetermined characteristics of photographic film contained within the cassette, and
stationary optical reader means having a photosensor positioned over the path of the bar code for reading the bar code as the disc rotates to provide an output representative of said film characteristics.

13. Camera apparatus adapted to receive a film cassette having a rotatable disc axially mounted at one end thereof, the disc having optically readable radial bar code indicia disposed in a circumferential path on an exterior surface of the disc, said bar code having a predetermined format including a start code segment and a data code segment comprised of alternating elements of bars and spaces in which the angular dimension of each of said elements along the circumferential code path corresponds to a predetermined multiple of a predetermined angular segment of the disc, the cassette further having first and second visual indicators rotatable relative to each other and adapted to be aligned at one of a plurality of angular positions of said disc following rewind of film in the cassette, the camera apparatus comprising:
means for rotationally driving said disc at least during rewind of film into the cassette;
stationary optical reader means having a photosensor positioned over the path of the bar code for reading the bar code and providing an output representative thereof as the disc rotates;
means for providing a signal representative of a particular film usage condition;
and controller means for calculating from the bar code output a stopping position for the bar coded disc at a predetermined angular position of the disc relative to the start code segment which visually indicates said particular film usage condition and for causing said rotational driving means to stop rotation of the disc at said predetermined angular position to indicate said particular film usage condition after the film is rewound into the cassette.

14. A method of positioning visual indicators on a film cassette in a camera comprising:
providing in a cassette receiving cavity in a camera a film cassette having a rotatable disc axially mounted at one end thereof, the disc having optically readable radial bar code indicia disposed in a circumferential path on an exterior surface of the disc, said bar code having a predetermined format including a start code segment and a data code segment comprised of alternating elements of bars and spaces in which the angular dimension of each of said elements along the circumferential code path corresponds to an integral multiple of a predetermined angular segment of the disc, the cassette further having first and second visual indicators rotatable relative to each other and adapted to be aligned at one of a plurality of angular positions of said disc following rewind of film in the cassette, the method comprising:
reading the disc bar code at least during rewind of the film into the cassette to produce a bar code output signal;
calculating from the bar code output signal a predetermined angular position at which the disc is to be stopped for a desired alignment of the relatively rotatable visual indicators;

sensing the start code segment of the bar code;

thereafter reading the bar code to sense when the disc has reached said predetermined angular position following the start code segment and stopping the relative rotation of the visual indicators when said predetermined angular position of the disc is reached.

15. The method of claim 14 in which the calculation includes the step of assigning predetermined differential weighted values to the binary transitions of the bar code and in which the reading of the bar code to determine when the disc has reached the predetermined angular position comprises sensing each transition of the bar code elements and accumulating the corresponding weights values until the predetermined angular position is reached.

16. The method of claim 14 in which, when the start code is sensed, a clock signal is initiated with a period between clock ticks which is integrally related to an angular width of an element in the data code, in which said calculation includes determining the number of clock ticks which correspond to the predetermined angular position of the disc and in which the disc is rotated until said number of clock ticks is reached.

17. The method of claim 16 in which bar code data elements are continued to be sensed after initiation of the clock signal and the period of the clock ticks is synchronized with the bar code data elements at transitions between said bar code data elements.

* * * * *